(12) United States Patent
Bracken et al.

(10) Patent No.: US 10,413,828 B2
(45) Date of Patent: *Sep. 17, 2019

(54) INCORPORATING PLAYER-GENERATED AUDIO IN AN ELECTRONIC GAME

(71) Applicant: SONY INTERACTIVE ENTERTAINMENT AMERICA LLC, San Mateo, CA (US)

(72) Inventors: Andrew E. Bracken, San Diego, CA (US); Kurt B. Kellenberger, San Diego, CA (US); Christopher G. Braymen, Ramona, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/854,044

(22) Filed: Dec. 26, 2017

(65) Prior Publication Data
US 2018/0193747 A1    Jul. 12, 2018

Related U.S. Application Data

(63) Continuation of application No. 15/168,830, filed on May 31, 2016, now Pat. No. 9,849,386, which is a
(Continued)

(51) Int. Cl.
*A63F 13/00* (2014.01)
*A63F 13/54* (2014.01)
(Continued)

(52) U.S. Cl.
CPC .............. *A63F 13/54* (2014.09); *A63F 13/10* (2013.01); *A63F 13/335* (2014.09); *A63F 13/63* (2014.09);
(Continued)

(58) Field of Classification Search
CPC .......... A63F 13/12; A63F 13/54; A63F 13/63; A63F 13/87
See application file for complete search history.

(56) References Cited

U.S. PATENT DOCUMENTS 5,149,104 A    9/1992   Edelstein
5,556,107 A    9/1996   Carter
(Continued)

FOREIGN PATENT DOCUMENTS

WO    WO 2007/110618 A1    10/2007

OTHER PUBLICATIONS

McGlaun, Shane, "Automated Smack Talking for Your XBOX 360, Gaming," Oct. 2, 2006.
(Continued)

*Primary Examiner* — Lawrence S Galka
(74) *Attorney, Agent, or Firm* — Polsinelli LLP

(57) ABSTRACT

Incorporating player-generated audio in an electronic game is disclosed. Incorporation may include receiving an audio clip from an electronic game player, applying a modification to the audio clip to generate a chant, associating the chant to the execution of an event in the electronic game, retrieving the chant when the event in the electronic game is executed, and initiating the play of the chant upon execution of the event in the electronic game.

15 Claims, 4 Drawing Sheets

Related U.S. Application Data continuation of application No. 12/291,330, filed on Nov. 7, 2008, now Pat. No. 9,352,219.

(51) Int. Cl.
  *A63F 13/63* (2014.01)
  *A63F 13/87* (2014.01)
  *A63F 13/814* (2014.01)
  *A63F 13/40* (2014.01)
  *H04L 29/06* (2006.01)
  *A63F 13/335* (2014.01)

(52) U.S. Cl.
  CPC ............ *A63F 13/814* (2014.09); *A63F 13/87* (2014.09); *H04L 67/42* (2013.01); *A63F 2300/6018* (2013.01); *A63F 2300/6081* (2013.01); *A63F 2300/8047* (2013.01)

(56) References Cited

U.S. PATENT DOCUMENTS

| | | |
|---|---|---|
| RE36,574 E | 2/2000 | Hochstein et al. |
| 6,241,612 B1 | 6/2001 | Heredia |
| 6,529,585 B2 | 3/2003 | Ng |
| 6,905,414 B2 | 6/2005 | Danieli et al. |
| 6,908,389 B1 * | 6/2005 | Puskala .................. A63F 13/12 463/40 |
| 6,963,839 B1 | 11/2005 | Ostermann et al. |
| 7,090,582 B2 * | 8/2006 | Danieli .................. A63F 13/12 463/35 |
| 7,107,110 B2 | 9/2006 | Fay et al. |
| 7,169,996 B2 | 1/2007 | Georges et al. |
| 7,277,870 B2 | 10/2007 | Mourad et al. |
| 7,371,175 B2 | 5/2008 | Gilboy et al. |
| 7,376,475 B2 | 5/2008 | Fay et al. |
| 7,383,497 B2 | 6/2008 | Glenner et al. |
| 7,386,356 B2 | 6/2008 | Fay et al. |
| 7,444,194 B2 | 10/2008 | Fay et al. |
| 7,451,177 B1 | 11/2008 | Johnson et al. |
| 7,478,047 B2 | 1/2009 | Loyall et al. |
| 7,498,504 B2 | 3/2009 | Bourgeois |
| 9,262,890 B2 | 2/2016 | Bracken |
| 9,352,219 B2 | 5/2016 | Bracken |
| 9,849,386 B2 | 12/2017 | Bracken |
| 2002/0007276 A1 | 1/2002 | Rosenblatt et al. |
| 2004/0024822 A1 | 2/2004 | Werndorfer et al. |
| 2005/0043097 A1 | 2/2005 | March et al. |
| 2005/0059434 A1 | 3/2005 | Hong |
| 2006/0095262 A1 | 5/2006 | Danieli |
| 2006/0154683 A1 | 7/2006 | Umezawa et al. |
| 2007/0021145 A1 | 1/2007 | Lam |
| 2007/0268312 A1 | 11/2007 | Marks et al. |
| 2008/0090659 A1 | 4/2008 | Aguilar et al. |
| 2008/0125222 A1 | 5/2008 | Okubu |
| 2009/0082100 A1 | 3/2009 | Zalewski |
| 2010/0022281 A1 * | 1/2010 | Cohen .................... H04B 1/385 455/569.1 |
| 2010/0113160 A1 | 5/2010 | Belz et al. |
| 2010/0120532 A1 | 5/2010 | Bracken |
| 2010/0120533 A1 | 5/2010 | Bracken |
| 2016/0367898 A1 | 12/2016 | Bracken |

OTHER PUBLICATIONS

U.S. Appl. No. 12/291,330 Office Action dated Oct. 7, 2015.
U.S. Appl. No. 12/291,330 Final Office Action dated Nov. 28, 2011.
U.S. Appl. No. 12/291,330 Office Action dated May 23, 2011.
U.S. Appl. No. 12/313,297 Final Office Action dated Nov. 7, 2011.
U.S. Appl. No. 12/313,297 Office Action dated Jun. 2, 2011.
U.S. Appl. No. 15/168,830 Office Action dated Apr. 24, 2017.

* cited by examiner

INCORPORATING PLAYER-GENERATED AUDIO IN AN ELECTRONIC GAME

CROSS-REFERENCE TO RELATED APPLICATIONS

This application is a continuation and claims the priority benefit of U.S. patent application Ser. No. 15/168,830 filed May 31, 2016, issuing as U.S. Pat. No. 9,849,386, which is a continuation and claims the priority benefit of U.S. patent application Ser. No. 12/291,330 filed Nov. 7, 2008, now U.S. Pat. No. 9,352,219, the disclosures of which are incorporated herein by reference.

BACKGROUND OF THE INVENTION

Field of the Invention

The present invention generally relates to electronic gaming and user-generated content. More specifically, the present invention concerns the use and incorporation of user-generated audio content in an electronic gaming environment.

Description of the Related Art

Present networked video game play offers the ability to engage in conversation with other players. Such conversation is usually achieved through the likes of a USB- or Bluetooth®-microphone headset. The various participants in a network game will carry on conversations related to events in the game including 'smack talk' or other 'taunting' of game players. This audio exchange is heard by all other members engaged in a particular game play session.

In an instance of such 'smack talk,' one player might chastise the game play skills (or lack thereof) of another game player in response to a particularly humbling moment in game play. For example, one player might kill another game player in a military role playing game and victoriously proclaim their 'kill shot.' Similarly, one player might effectuate a vicious tackle on another player in a football game thereby resulting in a fumble. The tacking player would then announce their game play prowess to the detriment of the tackled player that also committed an embarrassing and possibly costly turn-over.

Notwithstanding the ability of game players to introduce their personal commentary into networked game play and for that commentary to be heard by all other game players in a particular game session, the related art is lacking in many respects. First, a user must repeatedly interject their commentary by speaking into the microphone (headset or handheld). In a second such example, a user must make the commentary in the context of continued game play. Repeatedly introducing commentary may be complicated by a particularly difficult game situation or environment thereby making the addition of audible commentary distracting and perhaps detrimental to continued advancement in the game.

The related art is also deficient in that a user may not have access to the necessary equipment to introduce commentary during game play. For example, a user may not have a headset to allow for simultaneous game play and provisioning of commentary. A still further example instance of lacking in the art is where a user's hardware platform lacks the necessary input ports to allow for introduction of both a control device and headset notwithstanding the fact of whether the headset was available.

The art exhibits yet another lacking in that all user commentary comes directly from the user as a single voice. In certain game environments—such as a sporting game set in a large arena—'smack talk' or related user commentary may sound out of place or 'small' in the context of the overall game environment. Thus, a need clearly exists for improved methodologies for introducing player-generated audio into an electronic game.

SUMMARY OF THE INVENTION

Exemplary methods and computer-readable storage media for incorporating player-generated audio in an electronic game are disclosed. Such methods may include receiving an audio clip from an electronic game player, applying a modification to the audio clip to generate a chant, associating the chant to the execution of an event in the electronic game, retrieving the chant when the event in the electronic game is executed and initiating the play of the chant upon execution of the event in the electronic game. In some embodiments, the methods may be executable by software.

Exemplary apparatus for executing the above methods are disclosed. Such apparatus may include an interface configured to receive an audio clip from an electronic game player, and a processor configured to execute software to apply a modification to the audio clip to generate a chant, associate the chant to the execution of an event in the electronic game, retrieve the chant when the event in the electronic game is executed, and initiate the play of the chant on an audio player upon execution of the event in the electronic game.

DETAILED DESCRIPTION

Figure 1:
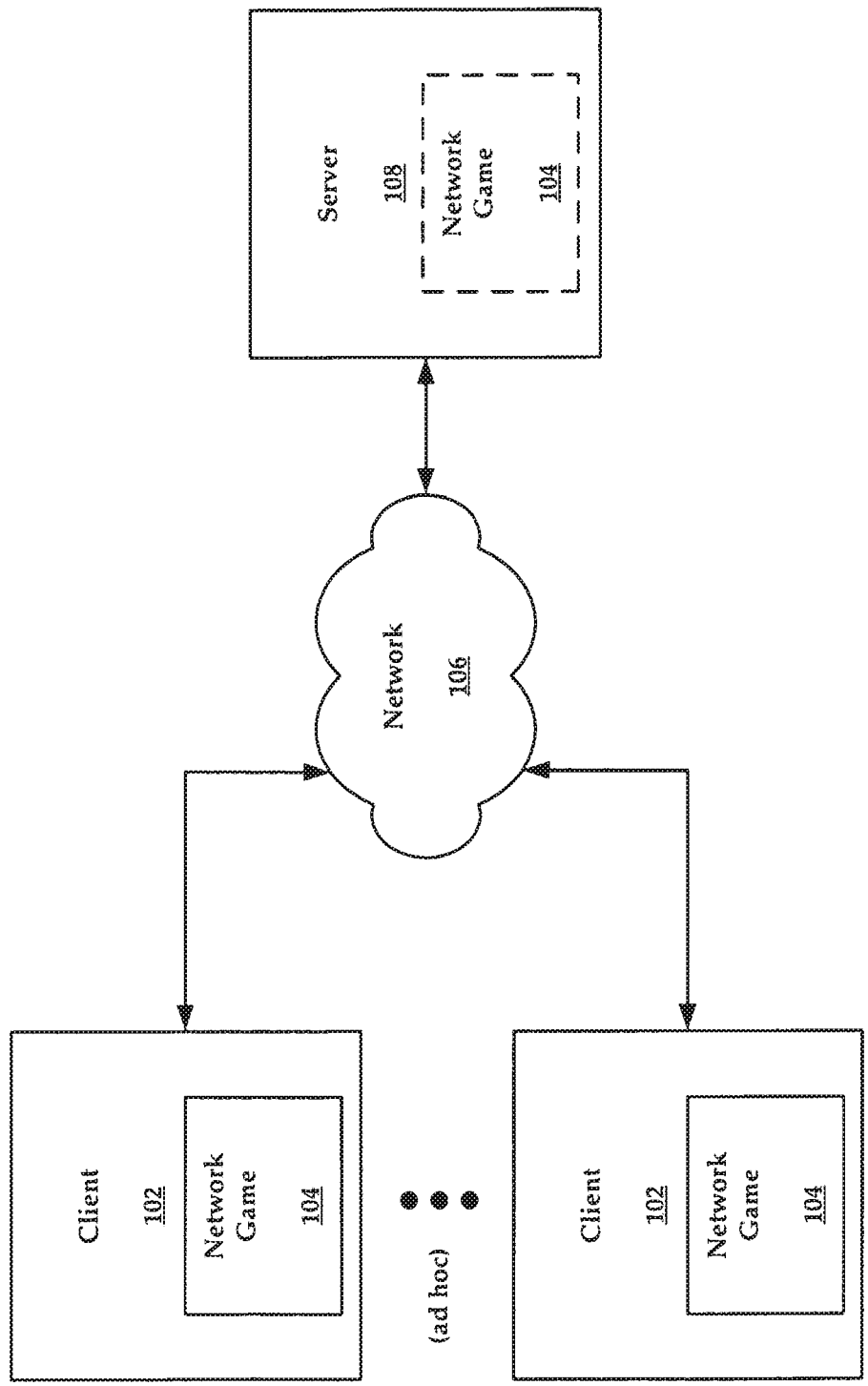
FIG. 1 illustrates an exemplary network environment for the introduction of player-generated audio.

FIG. 1 illustrates a schematic diagram of an exemplary architecture for incorporating player-generated audio into an electronic game. One or more clients 102 may include one or more electronic games 104. Electronic game 104 may be built-in (e.g., pre-loaded) to the client 102 or be introduced through an optical disk or other data storage medium. Electronic game 104 may also be obtained over a network. The client 102 may be connected to a server 108 via a communications network 106 or to one another through an ad hoc network.

The client 102 may include a game console such as a PlayStation® 3, a laptop computing device, a portable game device such as the PlayStation® Portable, a desktop computing device, a cellular telephone, or any other device capable of executing the electronic game 104 and connecting to the network 106 or, alternatively, an ad hoc network. The client 102 may be identified by an identification number such as a client ID or an address mechanism such as an IP address. An electronic game player using client 102 may 'sign on' to a network with a user name and/or password, which may be temporarily or permanently associated with the client 102.

Server 108 may include the electronic game 104; clients 102 may access the electronic game 104 on the server 108 via the network 106. The electronic game 104 on the server 108 may be an entire game, a portion of the game, or data related to the game as server 108 may also be a node allowing for the pass though, observation and/or collection of data related to the game 104 as the game 104 is played by users in the game community. The electronic game 104 may be similarly organized at various clients 102 (e.g., portions of the game or game data related to the game). Electronic game 104 may also be provided through, for example, a third-party content library server. The library server may or may not be a participating member of the architecture of FIG. 1.

Reference to a client 102 and a server 108 in the context of FIG. 1 and the remainder of the present disclosure is for the convenience of understanding various embodiments of the present invention. Embodiments of the present invention may be implemented in the context of a peer-to-peer network, a client-server network, or within a peer-group (e.g. a specified group of peers). In some instances, a client may function as a server and vice versa depending on the timing and the nature of a data exchange. For example, various clients in a peer-to-peer network may each include a portion of an electronic game 104 or data related to that game 104 and may send and receive the same. As such, any reference to a client or a server is meant to be inclusive of operations performed by one or both computing entities.

The electronic game 104 may include software that may be processed on or by the client 102 and/or that allows for or facilitates communication and data exchanges with the other clients 102 and server 108 via the network 106. The network 106 may include, for example, the Internet. Other proprietary or closed networks may be used either exclusively or in conjunction with the Internet. Certain security protocols (e.g., SSL or VPN) or encryption methodologies may be used to ensure the security of data exchanges over network 106, especially if the network 106 is a publicly accessible network such as the Internet.

Electronic game players associated with each of the clients 102 may interact with other electronic game players playing the electronic game 104. Accordingly, these electronic game players, or players, at clients 102 may compete with one another despite not being physically present with one another or sharing a common gaming device or console. Electronic game 104 may include various events for which an electronic game player may customize audio.

In an electronic baseball game, for example, an event may be a home run or the seventh-inning stretch. The event could also be the appearance of a particular game character in the game such as Ryan Howard of the Philadelphia Phillies stepping up to the plate. An event may constitute a combination of individual events. For example, an event may include the appearance of a game player in conjunction with a particular event such as Ryan Howard hitting a home run.

The execution of a game event in electronic game 104 may trigger the playback of customized audio provided by the game player. Playback of the customized audio may occur on the client device 102 of the player that generated the audio. Playback of the customized audio may also be distributed over a network for playback to all other game players taking part in the particular session of game play (e.g., a player controlling the pitcher and a player controlling an outfielder).

Electronic game 104 may also provide audio processing capabilities. The player may utilize these capabilities to enhance or otherwise manipulate player-generated audio and thereby positively affect the gaming experience. For example, in the aforementioned electronic game, a player may provide a single voice audio input to client 102. The user may then apply the processing capabilities provided by execution of the electronic game 104 at client 102 to, for example, generate a crowd chant thereby creating the illusion of mass participation.

Figure 2:
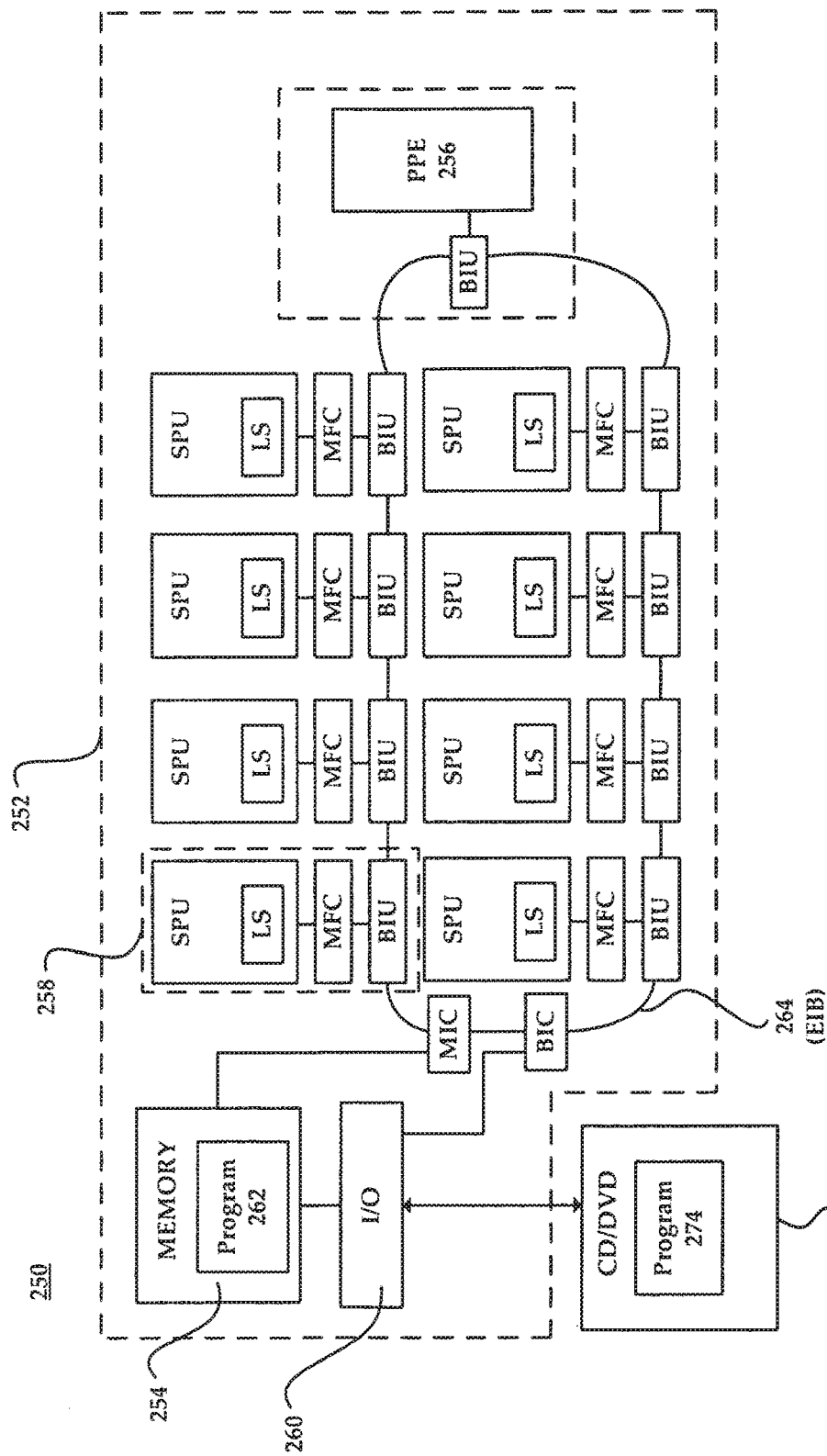
FIG. 2 illustrates a portion of an exemplary computing device that may—be utilized for the introduction of player-generated audio in an electronic game executed in a network gaming environment, namely the processor configuration thereof.

FIG. 2 illustrates a portion of an exemplary computing device 250 that may be utilized for the introduction of player-generated audio in an electronic game executed in a network gaming environment, namely the processor configuration thereof. The exemplary computing device 250 of FIG. 2 may be implemented in the context of client 102 for playing electronic game 104. The architecture of computing device 250 may be based on a Cell processor 252. Certain aspects of a computer architecture and high speed processing model utilizing a Cell processor are disclosed in U.S. patent publication number 2002-0138637 for a "Computer Architecture and Software Cells for Broadband Networks," the disclosure of which is incorporated herein by reference.

Additional information may be found at the Cell Broadband Engine™ Public Information and Download Site (http://cell.scei.co.jp/e download.html), specifically documentation entitled "Cell Broadband Engine™ Architecture" (V 1.01 dated Oct. 3, 2006) and "Synergistic Processor Unit (SPU) Instruction Set Architecture" (V 1.2 dated Jan. 27, 2007). The disclosure of each document is incorporated herein by reference. The Cell processor architecture represents the work of Sony Computer Entertainment Inc., Kabushiki Kaisha Toshiba, and International Business Machines Corporation.

Through the use of the aforementioned Cell processor, data and applications may be processed and packaged into uniquely identified and uniformly formatted software cells. The uniformity of structure and unique identification facilitates the processing of applications and data throughout a network of Cell processor equipped computing devices. For example, one computing device may formulate a software cell but distribute that cell to another device for processing. Thus, the cells may migrate throughout a network for processing on the basis of the availability of processing resources on the network.

The cell processor 252, in one exemplary embodiment, includes a main memory 254, a single power processor element (PPE) 256 and eight synergistic processor elements (SPE) 258. The cell processor 252 may be configured, however, with more than one PPE and any number of SPEs 258. Each SPE 258 comprises a synergistic processor unit (SPU) and a local store (LS).

Memory 254, PPE 256, and SPEs 258 may communicate with each other and with an I/O device 260 over, for example, a ring-type-element interconnect bus (EIB) 264 coupled to a bus interface controller (BIC). The PPE 256 and SPEs 258 may access the EIB 264 through bus interface units (BiII). The PPE 256 and SPEs 258 may access the main memory 254 over the EIB 264 through memory flow controllers (MFC) and memory interface controller (MIC).

Memory 254 may include a program 262 that implements executable instructions. The instructions may be read from a CD/ROM or other optical disc in CD/DVD reader 266 coupled to the I/O device 260, the CD/ROM or other optical disc being loaded into the reader 266. The CD/ROM, too, may comprise a program, executable instructions, or other data 274. Other information may be introduced to the computing device 250 through peripheral devices (not shown) such as a wireless or USB microphone headset. This information may include player-generated audio, which may then be processed by the processor 252 for distribution over a network to other client devices.

PPE 256 may be a standard processor capable of stand-alone processing of data and applications. In operation, PPE 256 may schedule and orchestrate the processing of data and applications by SPEs 258 and the associated SPU. The SPU may be a single instruction, multiple data (SIMD) processor. Under the control of PPE 256, the SPUs may process data and application in a parallel and independent manner. MIC may control accesses by PPE 256 SPUs to data and applications in main memory 254.

Figure 3:
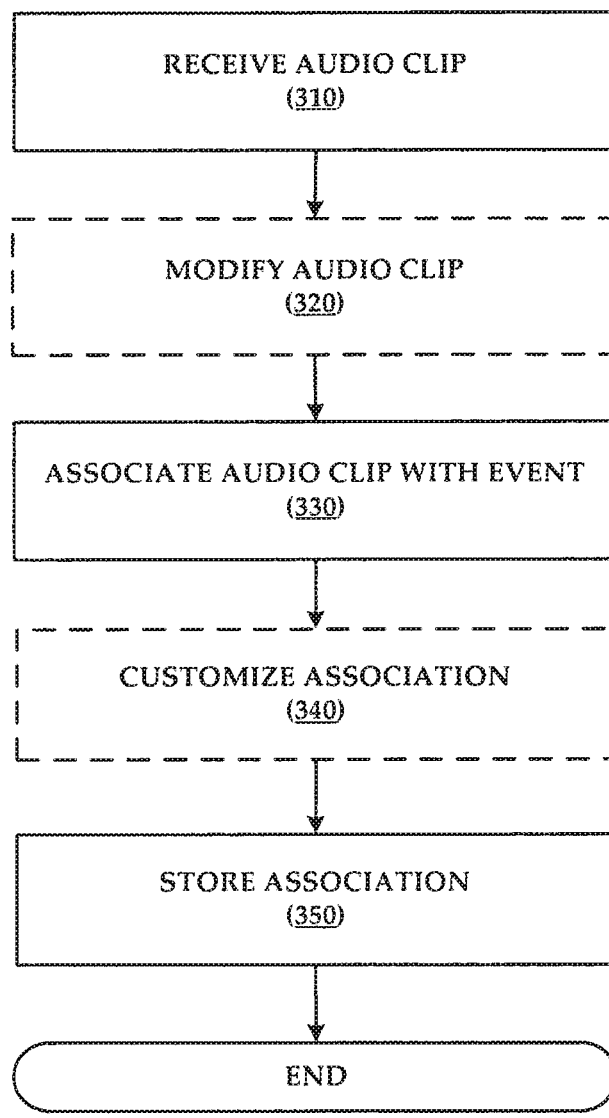
FIG. 3 illustrates an exemplary method for incorporating player-generated audio in an electronic game.

Referring to method 300 of FIG. 3, in step 310, an audio clip is received at Client 102 as generated by the player. This audio clip may be input to the client 102 and an electronic game 104 through a microphone or some other audio input device coupled to the client 104. The audio clip may also be introduced in the form of computer-readable storage media, the media having the clip stored thereon (e.g., a flash card or CD-ROM). The audio clip may be a simple phrase, a series of phrases or expressions, or may be a more complex and involved piece of content such as a song or sound track. In the latter instance, the song may be direct from a music CD that one might purchase in a store or electronic content downloaded from an on-line music provider. Audio clip may be stored directly in memory of the client 102 as may be the case when the clip is introduced through a microphone. The clip may be accessed as needed from the computer-readable medium. Clips from computer-readable storage media may also be transferred and stored on the client 102.

In some embodiments, step 310 may be conducted in the context of electronic game 104 or through a menu separate from game play such that the player has suspended game play in order to provide the audio. A recording interface may be made available to the player for recording the audio clip. Such an interface may display audio levels in a recording level meter, allow the player to start or stop the recording of an audio clip, or initiate playback of a captured audio clip such that the player may listen to the audio before accepting a recording.

Upon recording, the player may be prompted by electronic game 104 via the recording interface to provide further instructions regarding playback of the audio. This may include optional modification or processing in step 320 or customization of playback in electronic game 104 as may occur in step 340. Event association in step 330 may also occur via this interface.

In optional step 320, one or more modifications may be applied to the received audio clip. These modifications may occur through any number of digital signal processing techniques as are generally known in the art. For example, in step 310, a player may introduce a cheer or a chant. That cheer or chant, however, will be largely ineffective and seem out-of-place when uttered by a single user in the context of a stadium or arena environment as may be the case of a sporting game. Through the application of audio modification, however, the chant may be processed to sound as if it comes from dozens, hundreds, or thousands of other persons that might be present in the area or stadium.

Variations in tone and other acoustic properties may be applied such that the audio clip does not merely sound as if it is being uttered by hundreds of people in the exact same tone (e.g., the clip may be modified to sound as if it is being uttered by men, women, and children). These variations may be automated in the context of the game 104. For example, a user might input the audio clip and then select in a game menu an option to 'apply chant processing.' The game 104 may then execute the necessary processing to effectuate the aforementioned changes. In some embodiments, however, the game 104 may offer mixing tools where a user may manually make audio modifications to the file. These modifications may include, for example, the aforementioned addition of number of persons chanting, the environmental acoustics, the tone of the persons chanting, and the gender and age of the persons chanting. Audio clips may also be 'pre-processed' by another audio mixing application separate from the game 104 and then simply introduced to the client 102 as was the case in step 310 above.

In step 330, the audio clip, which may have been processed in step 320, is associated with an event in electronic game 104. Game events are inclusive and may encompass any repeatable and/or categorical instance in game 104. For example, in the context of a baseball game, a particular player stepping up to bat may constitute an event. In a football game, completion of a pass more than a certain number of yards may constitute an event. In a military role playing game, eliminating a target may constitute an event. In a racing game, beating a particular competitor or competitors may constitute an event. These examples all reflect the breadth and inclusive nature of game events that may be associated with the audio clip.

Audio clip may be a clip having been immediately presented in step 310. Audio clip may also be stored on client 102 or some other storage medium without an immediate association to a game event. A player may then retrieve a previously stored audio clip and associate it with a game event in step 330. Certain default setting may also apply in electronic game 104 concerning a default category or library of clips as they pertain to a similar catalog of game events. These default settings may be applied until a new association is made (or removed) and/or otherwise customized as described in step 340 below.

Events eligible for association may be categorized by a designer of a game or may be selected by a game player. Selection of events for association and the actual association of events may occur through menu navigation whereby an event or groups of events is identified, selected, and then a particular audio clip is identified and selected and associated with the previously selected event. In some embodiments, certain application programming interfaces (APIs) may be made available whereby a more advanced game player can associate audio clips with particular events not otherwise identified in the likes of a drop down menu. Similarly, a user may be able to use such APIs to expand the events eligible for association with an audio clip.

In optional step 340, the audio clip-event association playback may be customized. For example, the game player may not want a particular audio clip to be played each and every time a particular player steps up to the plate. In such an instance, the player may set the frequency to every other time, every third time, a randomized selection, or any other particular frequency as may be applicable to the event in the game. Other aspects of the association may be characterized including duration of playback. By further example, the audio clip-event association playback may only occur if a particular other player or competitor is also present in a networked game play session. Similarly, the audio clip-event association playback may only be presented over the game play network to a particular player or group of players instead of all players involved in the session.

A player may also have associated a number of audio clips with a particular event. Through customization, the player may set a randomizer with respect to which of the audio clips is played in the context of that particular event. Customization may occur through a menu or some other interface or be more complexly coded through the use of APIs as discussed above. Alternatively, a default setting may be used. In step 350, the audio clip-event association and any customization information is stored.

The player may provide additional audio clips in which case steps 310-350 may be repeated. Alternatively, the player may begin game play of electronic game 104 utilizing the aforementioned audio clips. Upon execution of the event in electronic game 104—and subject to any customization or other limitations—the associated audio clip is retrieved from memory and play of the audio clip is initiated in the context of the game event. Playback of that clip, again subject to any customization limitations, may be transmitted over the game play network to other game players involved in a particular gaming session.

The audio clip may be played (locally) via an audio player on client 102 or on an audio device independent but otherwise coupled to client 102. Transmitting the audio clip to another client device in the game network and/or session may occur via network cables, network 106, or via an ad hoc network to another client 102.

Figure 4:
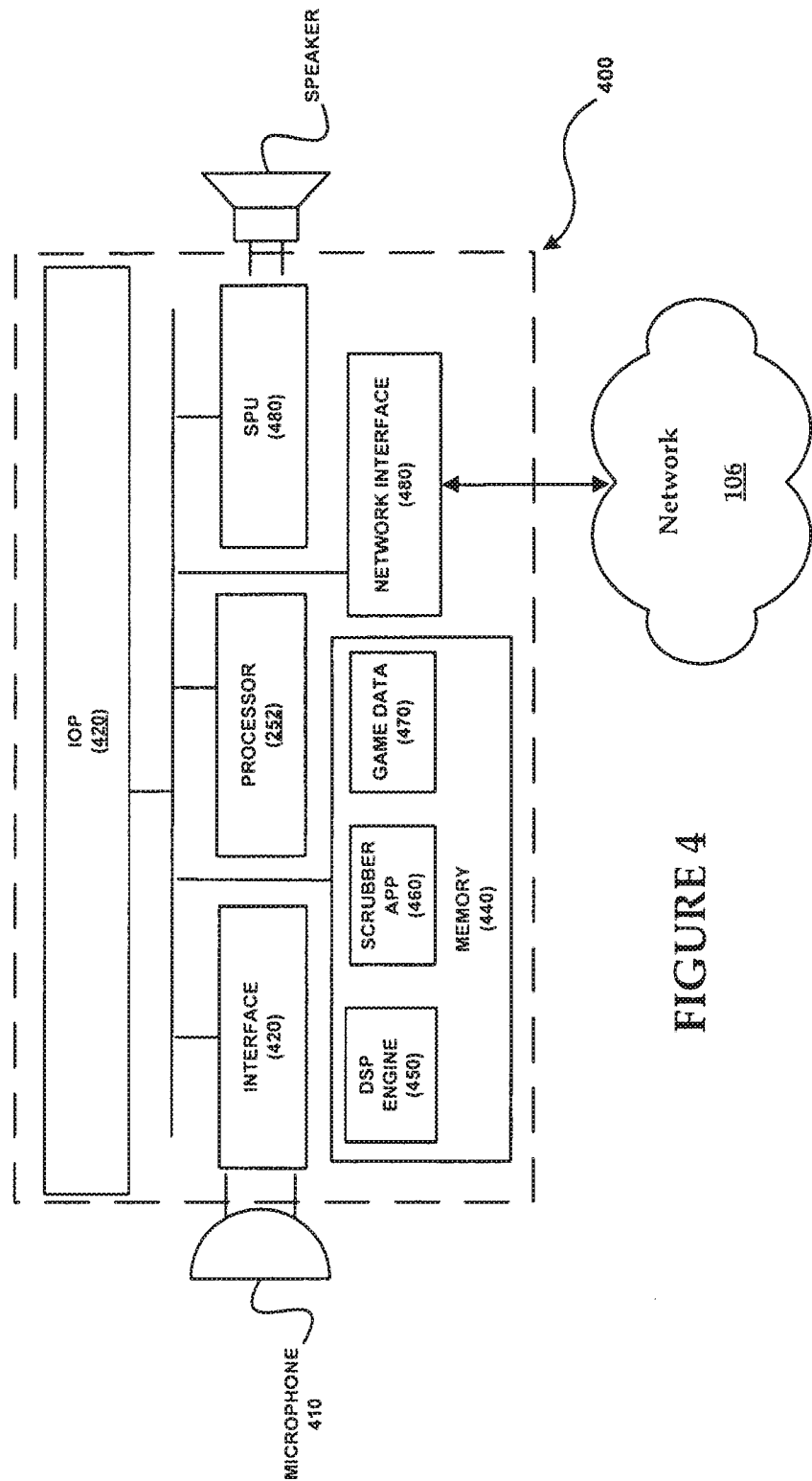
FIG. 4 illustrates an exemplary system that may be used for incorporating player-generated audio in an electronic game executed in a network gaming environment including the exemplary processor configuration of FIG. 2.

FIG. 4 illustrates an exemplary system 400 that may be used for incorporating player-generated audio in an electronic game executed in a network gaming environment including the exemplary processor configuration of FIG. 2. System 400 may constitute a portion of or the entirety of client 102. System 400 may execute all or portions of a method 300 for incorporating player-generated audio into electronic game 104.

A player may make use of microphone 410 in order to record an audio clip. The input to microphone 410 may be passed to interface 420. Interface 420 is inclusive of a Universal Serial Bus (USB) interface, an IEEE 1394 interface, an wireless interface, which (in some instances) may be network interface 490 as discussed below. Interface 420 is likewise inclusive of a memory card interface. Audio input may also be provided through the likes of an optical disc and optical disc control unit/reader (not shown).

Interface 420 is coupled to input/output processor (IOP) 430 via one or more system bus, which may or may not be dedicated depending on a particular implementation of system 400. IOP 430 controls data exchanges between interface 420, Cell processor 252—as was previously described in the context of FIG. 2—sound processing unit (SPU) 480, network interface 490, and memory 440. IOP 430 also controls a variety of other system components including graphics processing units (not shown) and controller interfaces (not shown) as well as optical disc control units (not shown) and hard disc drive (not shown). The SPU 480 executes instructions and processes data to produce sound signals that may be output on an audio device such as speaker. Sound signals may likewise be transmitted over network 106 via network interface 490.Network interface 490 provides hardware functionality for the system 400 to connect to a network, which may or may not be wireless. Network adaptor 490 may also include or access certain software in the system 400 to allow for identification and connection to a particular Internet Protocol address and/or connect to a particular Internet Service Provider. Software may also provide other functionalities, such as the creation and maintenance of user profiles. Network interface 490 may allow for communications over a local area network or point-to-point network (e.g., receiving instructions from a wireless control device). Network interface 490 may concurrently operate to allow for wide area network communications, such as those over the Internet or with a remotely located client device (as shown in FIG. 1).

Cell processor 252 executes programs stored in, for example, memory 440. Cell processor 252 may likewise access and/or store information in memory 440 that may be needed and/or generated by one of the aforementioned programs. Memory 440 may contain pre-stored programs and may also contain programs transferred via the TOP 430 from a CD-ROM, DVD-ROM, or other optical disc (not shown) using an optical disc control unit (not shown) or from the network 106 via network interface 490 as well as interface 420.

In FIG. 4, memory 440 includes a digital signal processing engine 450, scrubber application 460, and game data 470 all of which may have been accessed via the likes of an electronic game 104. Game data 470 may include actual game data (e.g., rendering instructions). Game data 470 may also include data generated for the game, including audio clips and audio-clip/event association data.

Execution of digital signal processing engine 450 by processor 252 may allow for manipulation or processing of a pre-recorded audio clip input via interface 420. A player may choose to apply various modifications to the audio clip through digital signal processing engine 450. Scrubber application 460 may be executable by processor 252 to block unwanted audio transmissions sent over network 106. An example of such a scrubber application is disclosed in U.S. patent application Ser. No. 11/633,688 filed Dec. 4, 2006 and entitled "Removing Audio Distrubances in a Voice/Chat Network." Scrubber application 460 may be a part of electronic game 104 or a software application installed from another source outside of electronic game 104.

e As noted above, game data 470 may include data for the execution of electronic game 104 or may concern data about or for electronic game 104 including audio clip data. Cell processor 252 may create an association in memory 440 or some other database between the audio clip and the selected game event in response to a user instruction. Upon occurrence of the related event in the electronic game 104 and satisfaction of any customized aspect of the same, the audio clip may be retrieved and played back through the SPU 480 and a related output device (such as a speaker) and/or transmitted over network 106.

The methods identified in FIG. 3 (and the order thereof) are exemplary and may include various alternatives, equivalents, or derivations thereof including but not limited to the order of execution of the same. The steps of the method of FIG. 3 and its various alternatives may be embodied in hardware or software including a machine-readable storage media (e.g., optical disc and memory card) including programs and/or instructions executable by a machine such as the processor of a computing device. Likewise, the components shown in FIG. 4 are meant to be exemplary components in a hardware system configured to execute the methods described in FIG. 3. As such the descriptions and drawings should not be considered in a limiting sense, as it is understood that the disclosure presented is illustrative and not restricted to the embodiments discussed herein.

What is claimed is:

1. A method for incorporating player-generated audio into an electronic game, the method comprising:
   receiving one or more audio files recorded by a player using a wireless microphone, the audio files received at an interface of a computing device that executes the electronic game;

modifying the one or more received audio files based on player input received via a graphical user interface of the computing device;

defining one or more customizations related to playback of the one or more modified audio files during play of the electronic game, the customization definitions stored in memory;

detecting one or more triggers for playing the one or more modified audio files, the triggers detected during play of the electronic game; and playing a selected one of the one or more modified audio files during play of the electronic game when the triggers are detected, wherein the selected audio file is selected at random and played in accordance with the defined customizations.

2. The method of claim 1, wherein the wireless microphone is a portable device, and wherein modifying the audio files comprises executing an application separate from the electronic game.

3. The method of claim 1, further comprising distributing the modified audio files for playback to at least one other computing device.

4. The method of claim 3, wherein distributing the modified audio files comprises providing the modified audio files to a server associated with the electronic game.

5. The method of claim 3, wherein one or more other players are participating in the electronic game, and wherein the modified audio files are distributed for playback to a specified subset of the other players.

6. The method of claim 1, wherein playback of the modified audio files is conditioned on presence of a specified other player in the game session.

7. The method of claim 1, wherein modifying the audio files is based on one or more selections indicated by the user input at a graphical interface that is associated with the electronic game.

8. The method of claim 1, further comprising storing the received audio files in a storage device accessible to the computing device.

9. The method of claim 1, further comprising defining the triggers, wherein each trigger is defined in association with a specified event within the electronic game.

10. The method of claim 1, wherein the specified event is selected from a predetermined set of events associated with the electronic game.

11. The method of claim 10, wherein the player expands the predetermined set of events associated with the electronic game via an application programming interface.

12. The method of claim 10, wherein a plurality of modified audio files can be assigned to play when an event occurs within the electronic game, wherein play of the modified audio files is based on a frequency set by the player.

13. The method of claim 1, further comprising selecting the selected audio file at random.

14. A non-transitory computer-readable storage medium having embodied thereon a program, the program being executable by a computer to perform a method for incorporating player-generated audio into an electronic game, the method comprising:

receiving one or more audio files recorded by a player using a wireless microphone, the audio files received at an interface of a computing device that executes the electronic game;

modifying the one or more received audio files based on player input received via a graphical user interface at the computing device;

defining one or more customizations related to playback of the one or more modified audio files during play of the electronic game, the customization definitions stored in memory;

detecting one or more triggers for playing the one or more modified audio files, the triggers detected during play of the electronic game; and playing a selected one of the one or more modified audio files during play of the electronic game when the triggers are detected, wherein the selected audio file is selected at random and played in accordance with the defined customizations.

15. An apparatus for incorporating player-generated audio into an electronic game, the apparatus comprising:

an interface that receives one or more audio files recorded by a player using a wireless microphone;

memory that stores one or more customization definitions related to playback of the one or more modified audio files during play of the electronic game; and a processor that executes instructions stored in memory, wherein execution of the instructions by the processor:

modifies the one or more received audio files based on player input received via a graphical user interface;

detects one or more triggers for playing the one or more modified audio files, the triggers detected during play of the electronic game; and plays a selected one of the one or more modified audio files during play of the electronic game when the triggers are detected, wherein the selected audio file is selected at random and played in accordance with the defined customizations.

* * * * *